(12) United States Patent
Mishin et al.

(10) Patent No.: US 7,538,325 B2
(45) Date of Patent: May 26, 2009

(54) SINGLE-PULSE-SWITCHED MULTIPLE ENERGY X-RAY SOURCE APPLICATIONS

(75) Inventors: Andrey V. Mishin, North Andover, MA (US); William Wade Sapp, Jr., Melrose, MA (US); Peter Rothschild, Boston, MA (US)

(73) Assignee: American Science and Engineering, Inc., Billerica, MA (US)

( * ) Notice: Subject to any disclaimer, the term of this patent is extended or adjusted under 35 U.S.C. 154(b) by 0 days.

(21) Appl. No.: 11/931,431

(22) Filed: Oct. 31, 2007

(65) Prior Publication Data

US 2008/0111080 A1 May 15, 2008

Related U.S. Application Data

(63) Continuation-in-part of application No. 10/957,770, filed on Oct. 4, 2004, now abandoned, which is a continuation-in-part of application No. 10/750,178, filed on Dec. 31, 2003, which is a continuation-in-part of application No. 09/818,987, filed on Mar. 27, 2001, now abandoned, said application No. 10/957,770 is a continuation-in-part of application No. 10/156,989, filed on May 29, 2002, now abandoned, said application No. 10/957,770 is a continuation-in-part of application No. 10/161,037, filed on May 31, 2002, now Pat. No. 7,010,094, which is a continuation-in-part of application No. 09/919,352, filed on Jul. 30, 2001, now abandoned, which is a continuation-in-part of application No. 09/502,093, filed on Feb. 10, 2000, now Pat. No. 6,459,761.

(60) Provisional application No. 60/192,425, filed on Mar. 28, 2000, provisional application No. 60/360,854, filed on Mar. 1, 2002.

(51) Int. Cl.
*G01F 23/00* (2006.01)

(52) U.S. Cl. .................................. 250/358.1

(58) Field of Classification Search ............... 250/358.1
See application file for complete search history.

(56) References Cited

U.S. PATENT DOCUMENTS 3,748,487 A 7/1973 Edholm et al. ............... 250/512

(Continued)

FOREIGN PATENT DOCUMENTS

DE 40 17 100 12/1990

(Continued)

OTHER PUBLICATIONS

Jones et al, "Pulsed photon interrogation with neutron-induced-gamma-ray spectrometry for cargo inspection,", 1994, Proceedings of SPIE, vol 2276, pp. 326-337.*

*Primary Examiner*—David P Porta
*Assistant Examiner*—Kiho Kim
(74) *Attorney, Agent, or Firm*—Bromberg & Sunstein LLP (57) ABSTRACT

An x-ray inspection system for identifying fissile material includes one or more sources of penetrating radiation that generate first, second, and third instantaneous spectra where the object is exposed to the second only if there is no penetration of the first and the object is exposed to the third only if there is no penetration of the second. Further, the source of the second and the third spectra is a source adapted to provide single pulses. Consequently, ambient levels of radiation may be held below cabinet levels while identifying objects containing fissile material.

10 Claims, 5 Drawing Sheets

U.S. PATENT DOCUMENTS

| | | | |
|---|---|---|---|
| 3,919,467 A | 11/1975 | Peugeot | 178/6.8 |
| 4,180,737 A | 12/1979 | Kingsley | 250/367 |
| 4,255,664 A | 3/1981 | Rutt et al. | 378/5 |
| 4,511,799 A | 4/1985 | Bjorkholm | 250/367 |
| 4,620,099 A | 10/1986 | Schoenig, Jr. et al. | 250/358.1 |
| 4,667,107 A | 5/1987 | Wang | 250/390.01 |
| 4,780,897 A | 10/1988 | McDaniel et al. | 378/62 |
| 4,795,910 A | 1/1989 | Henderson et al. | 250/483.1 |
| 5,007,072 A | 4/1991 | Jenkins et al. | 378/88 |
| 5,040,199 A | 8/1991 | Stein | 378/56 |
| 5,278,887 A | 1/1994 | Chiu et al. | 378/156 |
| 5,334,840 A | 8/1994 | Newacheck et al. | 250/483.1 |
| 5,376,795 A | 12/1994 | Hasegawa et al. | 250/363.04 |
| 5,391,879 A | 2/1995 | Tran et al. | 250/367 |
| 5,394,454 A | 2/1995 | Harding | 378/86 |
| 5,412,704 A | 5/1995 | Horbaschek | 378/198.2 |
| 5,420,452 A | 5/1995 | Tran et al. | 257/418 |
| 5,524,133 A * | 6/1996 | Neale et al. | 378/53 |
| 5,572,034 A | 11/1996 | Karellas | 250/368 |
| 5,600,700 A | 2/1997 | Krug et al. | 378/57 |
| 5,650,626 A | 7/1997 | Trauernicht et al. | 250/370.09 |
| 5,692,028 A | 11/1997 | Geus et al. | 378/57 |
| 5,734,166 A | 3/1998 | Czirr | 250/390.11 |
| 5,753,921 A | 5/1998 | Trauernicht et al. | 250/370.09 |
| 5,764,683 A | 6/1998 | Swift et al. | 378/57 |
| 5,768,334 A | 6/1998 | Maitrejean et al. | 378/53 |
| 5,805,660 A | 9/1998 | Perion et al. | 378/53 |
| 5,838,759 A | 11/1998 | Armistead | 378/57 |
| 5,940,468 A | 8/1999 | Huang et al. | 378/57 |
| 5,973,328 A | 10/1999 | Hiller et al. | 250/390.01 |
| 5,978,438 A | 11/1999 | Resnick et al. | 378/4 |
| 6,151,381 A | 11/2000 | Grodzins et al. | 378/90 |
| 6,192,101 B1 | 2/2001 | Grodzins | 378/55 |
| 6,249,567 B1 | 6/2001 | Rothschild et al. | 378/88 |
| 6,262,421 B1 | 7/2001 | Tran | 250/370.09 |
| 6,278,115 B1 | 8/2001 | Annis et al. | 250/363.01 |
| 6,285,740 B1 | 9/2001 | Seely et al. | 378/98.9 |
| 6,292,528 B1 | 9/2001 | Wieczorek et al. | 378/19 |
| 6,876,711 B2 | 4/2005 | Wallace et al. | 376/154 |
| 7,010,094 B2 | 3/2006 | Grodzins et al. | 378/157 |

FOREIGN PATENT DOCUMENTS

| | | |
|---|---|---|
| EP | 0382560 | 8/1990 |
| EP | 0496438 | 7/1992 |
| EP | 0971215 | 1/2000 |
| EP | 0981999 | 3/2000 |
| FR | 2492159 | 4/1982 |
| WO | WO 97/18462 | 5/1997 |
| WO | WO 99/09400 | 2/1999 |
| WO | WO 99/33064 | 7/1999 |
| WO | WO 99/39189 | 8/1999 |
| WO | WO 00/33060 | 6/2000 |

* cited by examiner

SINGLE-PULSE-SWITCHED MULTIPLE ENERGY X-RAY SOURCE APPLICATIONS

CROSS REFERENCE TO RELATED APPLICATIONS

The present application is a continuation-in-part of U.S. Ser. No. 10/957,770, concurrently abandoned, which is a continuation-in-part of a U.S. patent application with Ser. No. 10/750,178, itself a continuation-in-part application of a U.S. patent application Ser. No. 09/818,987, filed Mar. 27, 2001, claiming priority from U.S. Provisional Application Ser. No. 60/192,425, filed Mar. 28, 2000. The immediate parent of the present application, U.S. Ser. No. 10/957,770, is also a continuation-in-part application of U.S. patent application with Ser. No. 10/156,989, filed May 29, 2002, which claims priority from a U.S. Provisional Application with Ser. No. 60/360,854, filed Mar. 1, 2002, as well as a continuation-in-part of U.S. patent application Ser. No. 10/161,037, which is a continuation-in-part of U.S. patent application with Ser. No. 09/919,352, filed Jul. 30, 2001 which is a continuation-in-part of U.S. patent application with Ser. No. 09/502,093, filed Feb. 10, 2000. The disclosures of all of the above applications are incorporated herein, in their entirety, by reference. This application claims priority from all of the aforementioned applications.

TECHNICAL FIELD

The present invention relates to systems and methods for inspecting objects, particularly cargo in containers, trucks, and trains, using penetrating radiation corresponding to multiple spectra and to observing radiation transmission and scatter, and the initiation of photon-nucleus reactions.

BACKGROUND ART

X-ray inspection of containers is well established for many purposes including the search for contraband, stolen property and the verification of the contents of shipments that cross national borders. When an object enclosed within a container is detected, various characteristics can be assessed by its interaction with penetrating radiation. If low energy x-rays (i.e., less than 500 KeV) traverse the object, the object can be assumed to not incorporate high-atomic-number fissile materials associated with a nuclear or radioactive device. Observation of backscattered radiation can give more substantive information regarding organic content.

Upon probing of an object opaque to low energy x-rays with high energy x-rays (i.e., in a range up to approximately 3.5 MeV), regions of dense material are both more readily penetrated and more readily traversed. Regions opaque to high energy x-rays may be unusually dense fissile material. However, a container of dense material may still shield the characteristic x-rays emitted by such material from detection.

A determinative test for fissile material is exposure to x-rays of sufficient energy to initiate photon-nucleus reactions where the photoneutron products are detectable. One may expose the entire object to photon-nucleus reaction initiating (i.e., photoneutron-generating) radiation. However, this approach implicates the duration and flux of the x-ray pulse and may result in ambient levels of radiation in excess of acceptable standards.

SUMMARY OF THE INVENTION

In accordance with preferred embodiments of the invention, an inspection system is provided for inspecting objects. The inspection system has a first source of x-rays, where the first source is characterized, at any instant during which the first source is active, by a first instantaneous energy spectrum of penetrating radiation that is dominated by photons of energies less than or equal to a first fiducial energy. The inspection system also has a second source of pulsed penetrating radiation, distinct from the first source of x-rays, characterized, at different moments, by two distinct instantaneous spectra,     i. a second instantaneous spectrum dominated by photons of energies exceeding a second fiducial energy and less than a third fiducial energy; and     ii. a third instantaneous spectrum dominated by photons of energies exceeding a photo-nuclear reaction threshold.

Other components of the inspection system include an x-ray detector for detecting x-rays of the first source and of the second source that are transmitted through or scattered by the object, and a first conditional controller especially adapted to activate the second source in its second instantaneous spectrum only when x-rays of the first source fail to be transmitted through the object. Finally, the inspection system has a single-pulse switch for switching the second source between its second instantaneous spectrum and its third instantaneous spectrum, and a second conditional controller especially adapted to activate the single-pulse switch, thereby switching the second source to its third instantaneous spectrum for the duration of a single pulse, only when photons of the second instantaneous spectrum fail to be transmitted through the object.

In accordance with further embodiments of the invention, the inspection system may have a second detector for detecting products of an interaction between photons of the third instantaneous spectrum and the object. Moreover, the x-ray detector and the second detector may be spatially coextensive. The x-ray detector may include a transmission detector disposed distally to the inspected object with respect to at least one of the sources. Additionally, the second detector of products includes a neutron detector disposed between the inspected object and at least one of the first source of x-rays and the second source of penetrating radiation.

In accordance with yet other embodiments of the invention, the second source of penetrating radiation may be a linear accelerator, and the inspection system may also include a source of microwave energy and a radio frequency switch, the switch selectively coupling microwave energy to a first and a second section of the second source of penetrating radiation. An ambient radiation monitor may be provided for creating a signal based on radiation detected outside an exclusion zone, and a controller may be provided for regulating the intensity of at least one of the sources based at least on the signal. The controller may be especially adapted to regulate a number of beam pulses per unit time based on the signal.

In accordance with another aspect of the invention, a method is provided for inspecting an object, having the following steps:

a. irradiating the object with penetrating photons characterized by a first instantaneous energy spectrum that is dominated by photons of energies less than or equal to a first fiducial energy;

b. irradiating the object with penetrating photons emitted by a source of pulsed penetrating radiation if, and only if, photons characterized by the first instantaneous spectrum fail to be transmitted through the object, the pulsed radiation characterized, at different moments, by two distinct instantaneous spectra, i. a second instantaneous spectrum dominated by photons of energies exceeding a second fiducial energy and less than a third fiducial energy; and ii. a third instantaneous spectrum dominated by photons of energies exceeding a photo-nuclear reaction threshold; and c. activating the second source in its third instantaneous spectrum for a discrete number of pulses only when x-rays of the second instantaneous spectrum fail to be transmitted through a portion of the object.

BRIEF DESCRIPTION OF THE DRAWINGS

The foregoing features of the invention will be more readily understood by reference to the following detailed description, taken with reference to the accompanying drawings, in which.

DETAILED DESCRIPTION OF SPECIFIC EMBODIMENTS

This invention takes advantage of the fact that the spectra of x-rays generated by accelerating electrons into a target, as provided by individual or multiple linear accelerators ("linacs"), may be tailored to cover distinct energy ranges. Use of such distinct spectra, as produced by a linac having a Shaped Energy™ option (see U.S. Pat. No. 6,459,761, "Spectrally Shaped X-Ray Inspection System," issuing Oct. 1, 2002, hereby incorporated by reference) may allow for material identification within dense cargo while holding leakage dose rates to cabinet level specifications. A security system may also include backscatter recognition capability for organic recognition, as described, for example, in U.S. Pat. No. 5,313,511.

With a higher end of the linac energy range above a threshold of 7-10 MeV so as to be adequate for generating sufficient photo-neutron flux, reliable fissile material recognition capability may be provided by neutron detectors, even if the fissile material is concealed in an enclosure made of dense material (lead or tungsten, for example) that would otherwise obscure x-ray fluorescence, for example. A dense enclosure may reduce the flux of characteristic x-rays from the isotopes commonly used for nuclear weapons (such as $^{235}$U, $^{239}$Pu, $^{238}$U, $^{232}$U, or $^{241}$Pu) or "isotope signatures". For these listed isotopes, one expects to detect 186.7 keV and 205.3 keV, 375 keV and 413.7 keV, 1,001 keV, or 662.4 keV and 722.5 keV x-rays. (See U.S. Provisional Patent Application 60/192,425).

One embodiment of the present invention provides a combination of a high-energy irradiation spectrum transmission characterization of an inspected object, along with an optional high-energy operation to initiate photon-nucleus reactions in fissile material, if present. An indication of the presence of fissile material may be unusually dense matter in cargo, which cannot be easily or at all penetrated by x-rays at lower energy. An object in cargo may be considered to be composed of unusually dense matter if the object cannot be penetrated by a high-energy x-ray beam, which for example, is generated by an electron beam with energy of 3.5 MeV. A 3.5 MeV linac provides penetration of up to 300 mm of steel equivalent.

Upon observation of unusually dense matter not specified in a cargo manifest, a high degree of alert justifies use of higher energy x-rays (typically in vicinity of 10 MeV) to penetrate the observed dense matter. The described embodiments allow an operator or automated system to switch rapidly to a higher energy linac operation. If fissile material is present, high-energy photoneutrons are generated and detected by the neutron detectors, which are combined with moderators.

To reduce stray dose delivered to surrounding objects and personnel, the higher energy mode may be run with an extremely short duty cycle, corresponding in some cases to a single pulse or to a few pulses. Such an exposure would be sufficient to detect photo-neutrons while providing an average dose acceptable for a cabinet level system. Typical duration of the pulses may be from tens of nanosecond to microseconds.

Figure 1:
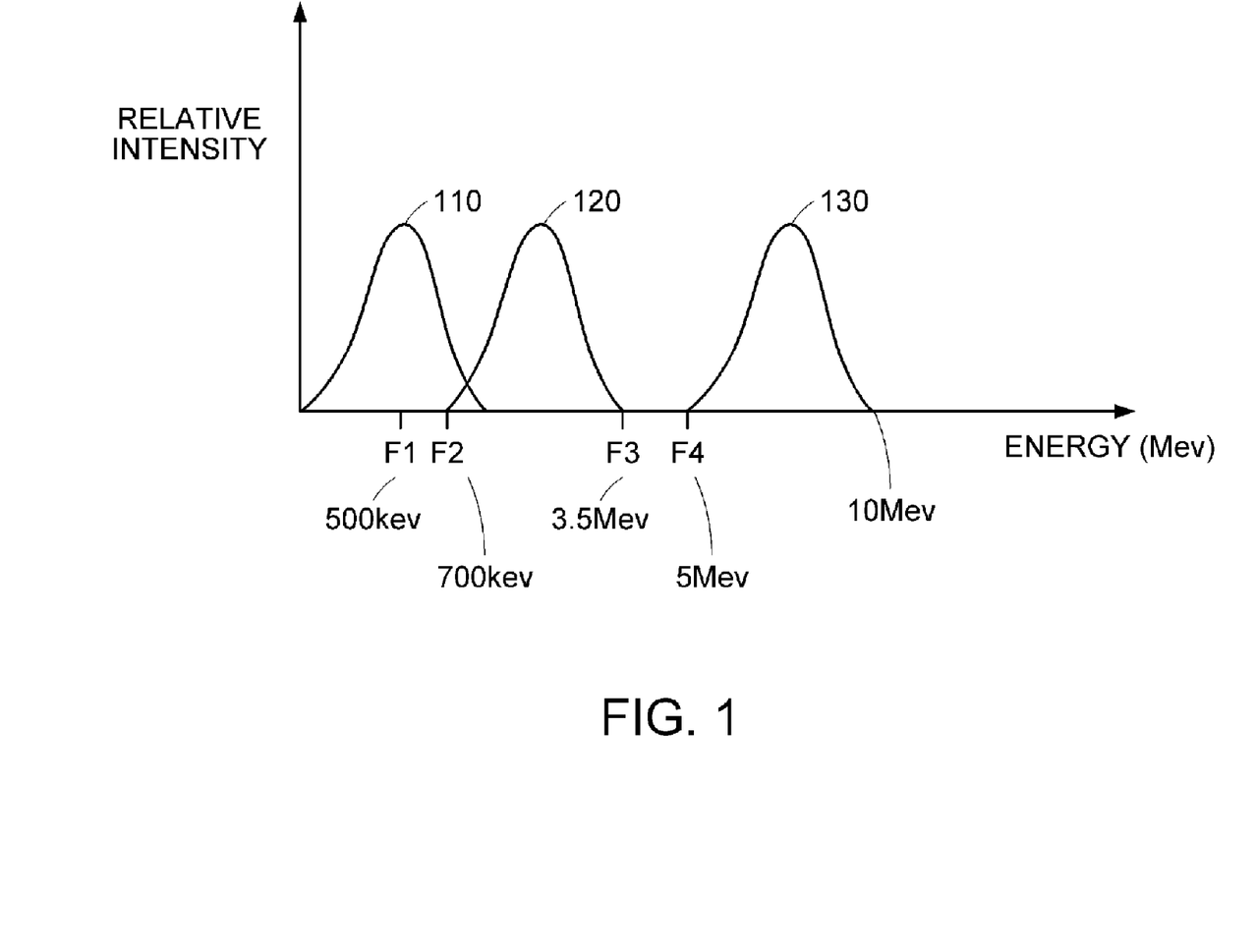
FIG. 1 is a schematic drawing of low-energy, high-energy, and reaction-initiating spectra.

FIG. 1 illustrates three spectra employed in distinguishing an object composed of fissile material. Low-energy spectrum 110 is characterized as dominated by x-ray energies less than or equal to a first fiducial energy F1. That is, half of the x-rays in spectrum 110 have energies less than F1. High-energy spectrum 120 is characterized as dominated by x-rays with energies above second fiducial energy F2 and less than third fiducial energy F3. Photon-nucleus reaction-initiating (i.e., photoneutron-generating) spectrum 130 is characterized as dominated by x-rays with energies above fourth fiducial energy F4, which may be referred to as a photo-nuclear reaction threshold. Each of the low-energy, high-energy, and photon-nucleus reaction-initiating spectrum is further characterized by an intensity.

There are a number of ways to produce the three spectra. For example, the low-energy spectrum 110 may be generated by a standard x-ray tube or as part of a Shaped Energy™ system (available from American Science & Engineering, Inc., Billerica, Mass.) that also generates the high-energy spectrum 120 as a filtered output. A linac may also generate the photoneutron-generating spectrum 130, either as part of a Shaped Energy™ system or individually.

Figure 2:
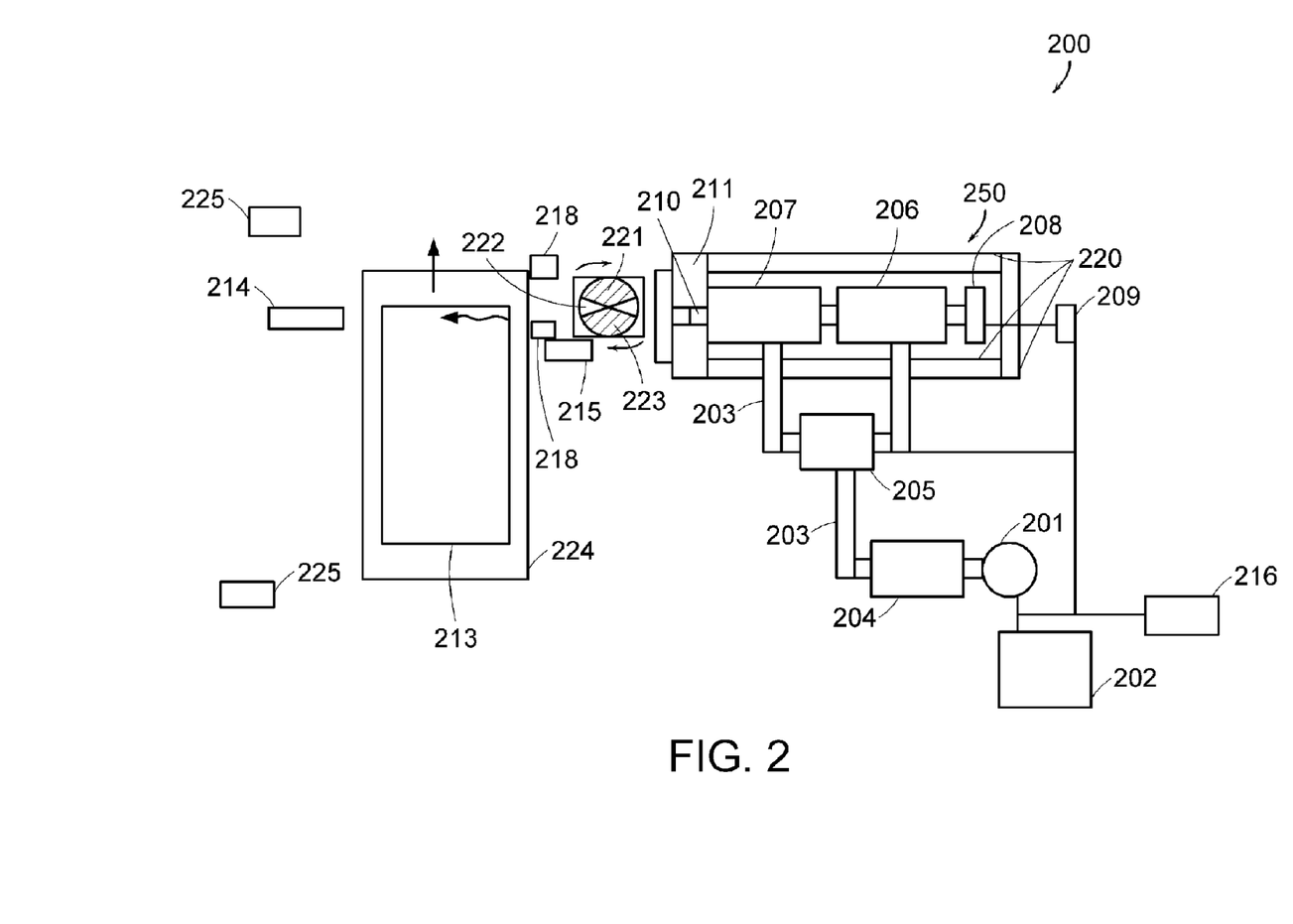
FIG. 2 is a schematic diagram of a multiple energy inspection system where a single linear accelerator generates the low-energy, high-energy, and reaction-initiating spectra.

FIG. 2 illustrates an embodiment of an inspection system 200 employing a single linac 250 to generate three spectra—low-energy, high-energy, and photoneutron-initiating. Linac 250 includes a mid-energy section 206 and a high-energy section 207 in tandem. The sections are powered by microwave energy that is generated by microwave power source 201 and that passes through circulator 204 and waveguide 203 before being directed to either or both sections by regulated power divider/phase shifter 205. Electrons generated by electron gun 208 powered by high voltage power supply 209 are accelerated by passage through the mid- and high-energy sections (206 and 207) and generate x-rays in striking heavy metal target 210. The x-rays are collimated by collimator 211 before exiting linac 250.

To produce x-rays corresponding to low-energy and high-energy spectra, only mid-energy section 206 is powered. Collimated x-rays leaving linac 250 pass through absorber 221. If the x-rays pass through open pie pair 222, a low-energy dominated spectrum results. If the x-rays pass through absorbing pie pair 223, a high-energy dominated spectrum results. Low- and/or high-energy x-rays passing through object 213, itself transported on carrier 224 in a direction perpendicular to the path of the x-rays, may be detected by linear detector array 214. Backscattered low-energy x-rays may be detected by backscatter detectors 218.

To produce high-energy x-rays suitable for generating photoneutrons, a regulator or controller 216 directs regulated power divider/phase shifter 205 to energize both mid-energy section 206 and high-energy section 207. At the same time, the console 216 causes the modulator 202 to modulate the microwave power source 201 and the high voltage power supply 209 to generate pulses of photoneutron-generating x-rays. Upon passage through the absorbing pie-shaped region 223 of the absorber 221, the x-rays impinge upon the object 213. Should the object 213 contain fissile material, neutron detector 215 detects photoneutrons generated by reactions within the fissile material initiated by the photoneutron-generating x-rays.

The object 213 is initially exposed to the low-energy x-ray spectrum 110 (for example, dominated by energies less than 500 KeV). If the low-energy x-rays penetrate the object 213, backscatter detector 218 may identify organic content in the object 213. If the object 213 is opaque to low-energy x-rays, object 213 may next be exposed to the high-energy x-ray spectrum 120 (for example, dominated by energies greater than 700 KeV and less than 3.5 MeV). If the object is opaque to high-energy x-rays, the object may be further exposed to a single pulse or to a few pulses of approximately tens of nanoseconds to microsecond duration of photoneutron-generating spectrum 130 (for example, dominated by energies greater than 5 MeV and less than 10 MeV). The neutron products from the pulse or pulses of radiation may be detected by neutron detector 215, which may be coextensive with a detector of transmitted or scattered x-rays. It is to be understood that detection of other products of the interaction of penetrating radiation with the object are within the scope of this invention.

Use of the linac 250 to generate three spectra of x-rays permits identification of fissile material without shielding in addition to the shielding 220 immediately surrounding the linac 250. Ambient radiation measured by ambient radiation detectors 225 is held below cabinet levels by a combination of employing a spectra containing higher energy x-rays only when observations based on a lower energy spectra are inconclusive—for example, if the object 213 is not totally penetrated by low-energy x-rays or, subsequently, if the object 213 is not totally penetrated by high-energy x-rays. Even beyond restricting photoneutron-generating x-rays to the latter case, exposure is further restricted by using only one or a couple of pulses to identify fissile material.

Figure 3:
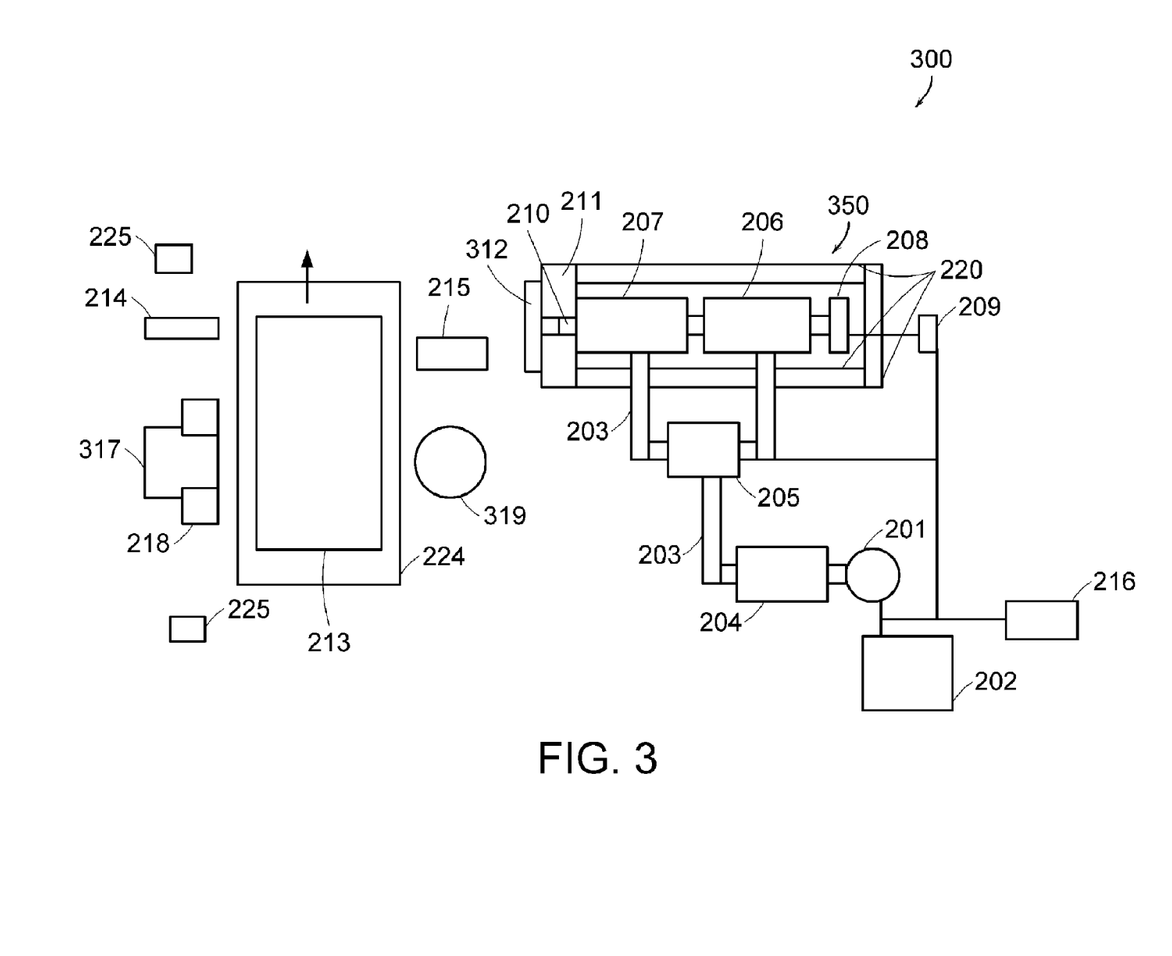
FIG. 3 is a schematic diagram of a multiple energy inspection system where a single linear accelerator generates the high-energy and the reaction-initiating spectra and a low-energy x-ray source generates the low-energy spectrum.

FIG. 3 shows a second inspection system 300 where a low-energy spectrum is furnished by a low-energy x-ray source 317. Low-energy transmission through the object 213 may be detected by a transmission detector 319. Further, backscattered low-energy x-rays may be detected by backscatter detectors 218.

Linac 350 generates high-energy x-rays of spectrum 120 and photoneutron-generating x-rays of spectrum 130. Low-energy x-rays are absorbed by low energy x-ray absorber 312. Switching between the high-energy spectrum and the photoneutron-generating spectrum is accomplished in the manner described with reference to the inspection system of FIG. 2.

Figure 4:
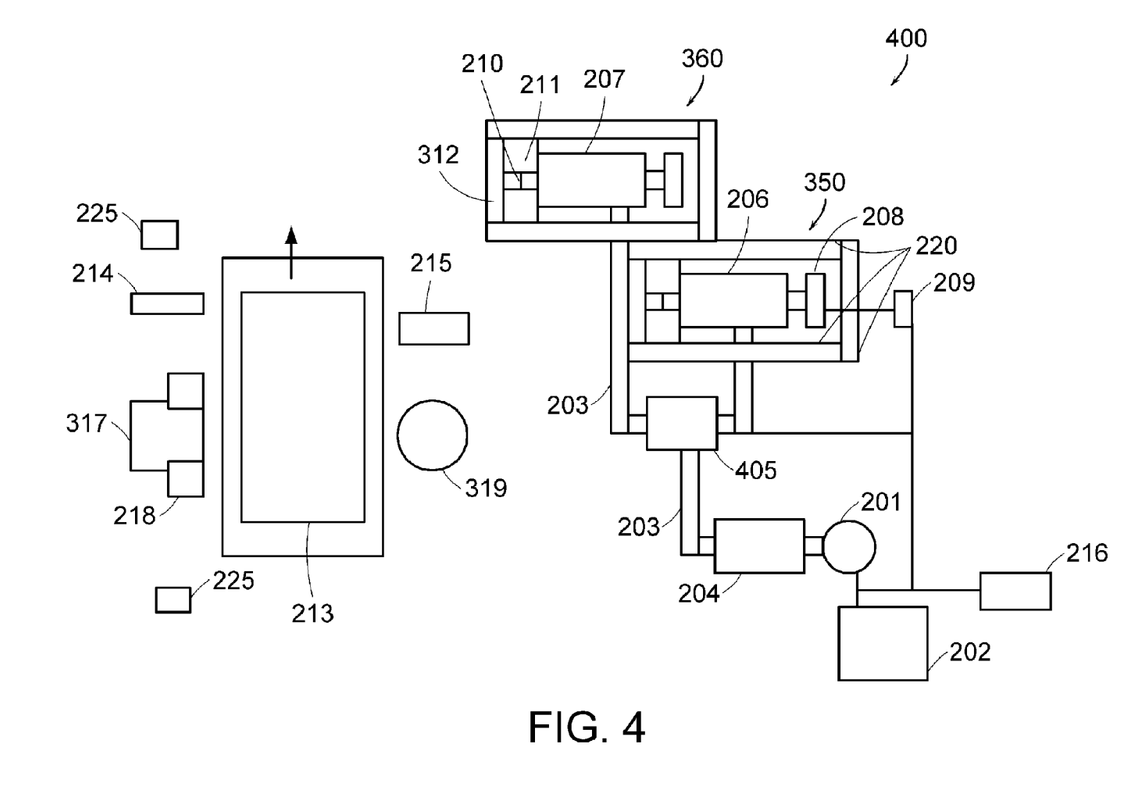
FIG. 4 is a schematic diagram of a multiple energy inspection system where two linear accelerators powered from the same source generate the high-energy and reaction-initiating spectra respectively and a low-energy x-ray source generates the low-energy spectrum.

FIG. 4 shows a third inspection system 400 containing separate generators of low-energy, high-energy, and photoneutron-generating x-rays. Low-energy x-rays are generated by low-energy source 317 and detected by low-energy transmission detector 319 and backscatter detector 218. High-energy x-rays are generated by mid-energy section 206 and transmission of high-energy x-rays through object 213 detected by linear detector array 214. Photoneutron-generating x-rays are generated by high-energy section 207. In this embodiment, a fast radio frequency switch 405 selectively directs power from microwave source 201 either to the mid-energy section 206 or to the high-energy (i.e., photoneutron-generating) x-ray section 207. Whereas in inspection system 300, mid-energy and high-energy sections share electron gun 208, microwave power supply 201, collimator 211, and low-energy absorber 312, in inspection system 400, the mid- and high-energy sections have individual electron guns and low-energy absorbers and share microwave power supply 201 and collimator 211. Linear detection array 214 detects high-energy x-ray transmission and photoneutron detector 215 detects photoneutrons.

Figure 5:
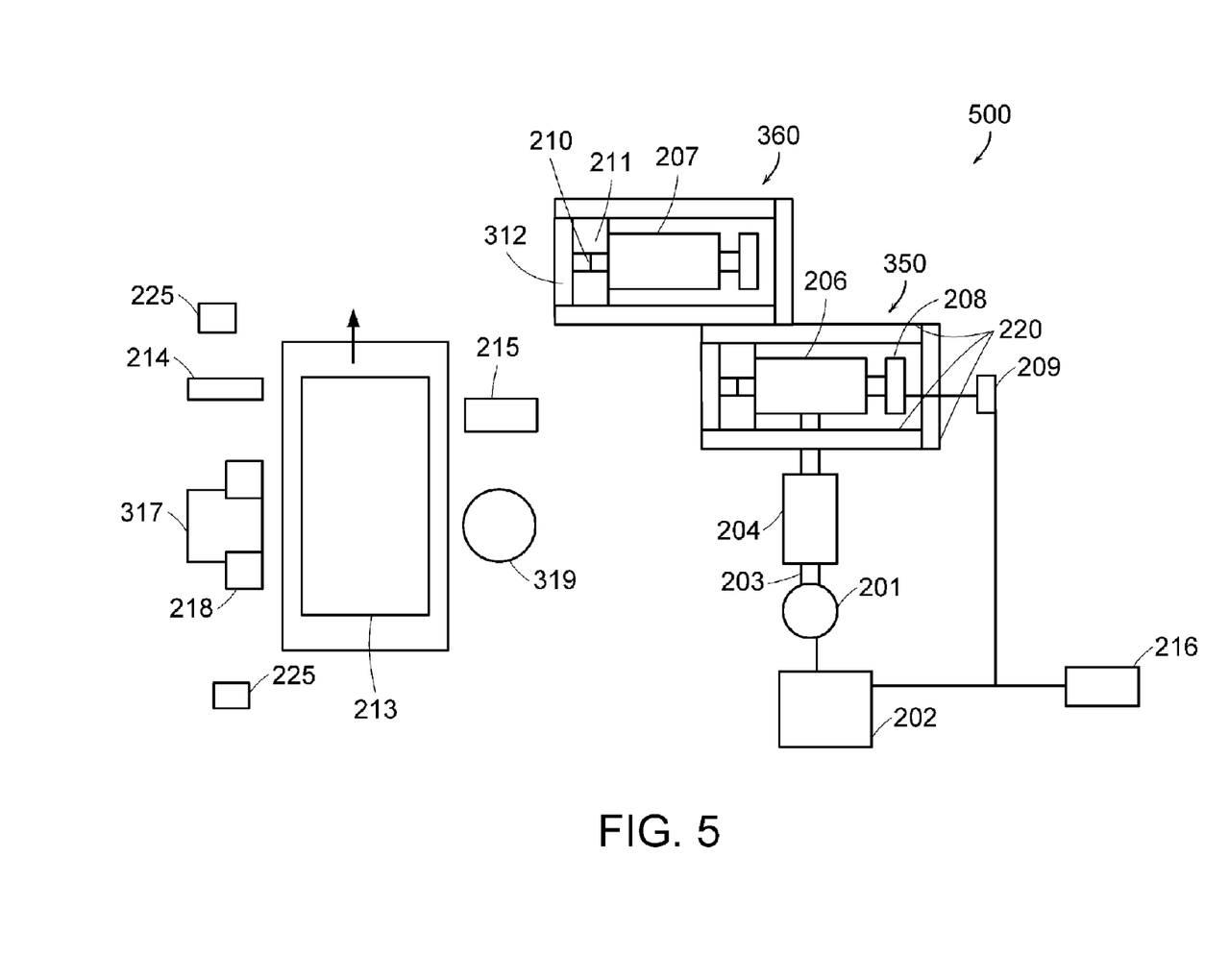
FIG. 5 is a schematic diagram of a multiple energy inspection system where two separately powered linear accelerators generate the high-energy and reaction-initiating spectra respectively and a low-energy x-ray source generates the low-energy spectrum.

FIG. 5 shows an inspection system 500 where generators of low-energy, high-energy, and photoneutron-generating x-rays are independent of each other. Low-energy x-rays are generated by 317 and detected by detectors 319 and 218 as described for FIGS. 3 and 4. High-energy x-rays are generated by a mid-energy section linac 350 and photoneutron-generating x-rays by an independent high-energy section linac 360. Photoneutron-generating x-rays may be generated for short periods of time as a single pulse or as a series of single pulses while high-energy x-rays and low-energy x-rays are continuously generated.

Although various exemplary embodiments of the invention are disclosed above, it should be apparent that those skilled in the art can make various changes and modifications that will achieve some of the advantages of the invention without departing from the true scope of the invention.

What is claimed is:

1. An inspection system for inspecting an object, the inspection system comprising:
    a) a first source of x-rays characterized, at any instant during which the first source is active, by a first instantaneous energy spectrum of penetrating radiation that is dominated by photons of energies less than or equal to a first fiducial energy, the x-rays for irradiating the object;
    b) a second source of pulsed penetrating radiation, distinct from the first source of x-rays, characterized, at different moments, by two distinct instantaneous spectra,
        (i) a second instantaneous spectrum dominated by photons of energies exceeding a second fiducial energy and less than a third fiducial energy; and
        (ii) a third instantaneous spectrum dominated by photons of energies exceeding a photo-nuclear reaction threshold;
    c) an x-ray detector for detecting x-rays of the first source and of the second source that are transmitted through or scattered by the object;
    d) a first conditional controller especially adapted to activate the second source in its second instantaneous spectrum only when x-rays of the first source fail to be transmitted through the object;
    e) a single-pulse switch for switching the second source between its second instantaneous spectrum and its third instantaneous spectrum;

f) a second conditional controller especially adapted to activate the single-pulse switch, thereby switching the second source to its third instantaneous spectrum for the duration of a single pulse, only when photons of the second instantaneous spectrum fail to be transmitted through the object.

2. An inspection system in accordance with claim 1, further comprising a second detector for detecting products of an interaction between photons of the third instantaneous spectrum and the object.

3. An inspection system according to claim 2, wherein the second detector of products includes a neutron detector disposed between the inspected object and at least one of the first source of x-rays and the second source of penetrating radiation.

4. An inspection system according to claim 1, wherein the x-ray detector and the second detector are spatially coextensive.

5. An inspection system according to claim 1, wherein the x-ray detector includes a transmission detector disposed distally to the inspected object with respect to at least one of the sources.

6. An inspection system according to claim 1, wherein the second source of penetrating radiation is a linear accelerator.

7. An inspection system according to claim 6, further including a source of microwave energy and a radio frequency switch, the switch selectively coupling microwave energy to a first and a second section of the second source of penetrating radiation.

8. An inspection system according to claim 1, further comprising:

a) at least one ambient radiation monitor for creating a signal based on radiation detected outside an exclusion zone; and b) a controller for regulating the intensity of at least one of the sources based at least on the signal.

9. An inspection system according to claim 8, wherein the controller is especially adapted to regulate a number of beam pulses per unit time based on the signal.

10. A method for inspecting an object, the method comprising:

a) irradiating the object with penetrating photons characterized by a first instantaneous energy spectrum that is dominated by photons of energies less than or equal to a first fiducial energy;

b) irradiating the object with penetrating photons emitted by a source of pulsed penetrating radiation if, and only if, photons characterized by the first instantaneous spectrum fail to be transmitted through the object, the pulsed radiation characterized, at different moments, by two distinct instantaneous spectra,
  (i) a second instantaneous spectrum dominated by photons of energies exceeding a second fiducial energy and less than a third fiducial energy; and
  (ii) a third instantaneous spectrum dominated by photons of energies exceeding a photo-nuclear reaction threshold; and c) activating the second source in its third instantaneous spectrum for a discrete number of pulses only when x-rays of the second instantaneous spectrum fail to be transmitted through a portion of the object.

* * * * *